(12) United States Patent
Sorrentino et al.

(10) Patent No.: US 10,723,052 B2
(45) Date of Patent: Jul. 28, 2020

(54) SYSTEM AND METHOD FOR FORMING AN ORAL CARE IMPLEMENT

(71) Applicant: COLGATE-PALMOLIVE COMPANY, New York, NY (US)

(72) Inventors: Alan Sorrentino, Cranbury, NJ (US); Stephen Nelson, New Brunswick, NJ (US)

(73) Assignee: Colgate-Palmolive Company, New York, NY (US)

( * ) Notice: Subject to any disclaimer, the term of this patent is extended or adjusted under 35 U.S.C. 154(b) by 261 days.

(21) Appl. No.: 15/726,067

(22) Filed: Oct. 5, 2017

(65) Prior Publication Data

US 2018/0029268 A1     Feb. 1, 2018

Related U.S. Application Data

(62) Division of application No. 14/611,879, filed on Feb. 2, 2015, now Pat. No. 9,802,347.

(51) Int. Cl.
| | | |
|---|---|---|
| A46B 5/02 | (2006.01) |
| B29C 45/16 | (2006.01) |
| B29L 31/42 | (2006.01) |
| B29C 45/27 | (2006.01) |

(52) U.S. Cl.
CPC ...... *B29C 45/1642* (2013.01); *B29C 45/2708* (2013.01); *B29C 2045/1651* (2013.01); *B29L 2031/425* (2013.01)

(58) Field of Classification Search
USPC .... 15/143.1, 167.1; 264/243, 245, 247, 255, 264/260
See application file for complete search history.

(56) References Cited

U.S. PATENT DOCUMENTS

| | | |
|---|---|---|
| 3,873,656 A | 3/1975 | Garner |
| 4,803,031 A | 2/1989 | Ochs et al. |
| 5,286,184 A | 2/1994 | Nakayama |
| 5,339,482 A | 8/1994 | Desimone et al. |
| 5,651,998 A | 7/1997 | Bertschi et al. |

(Continued)

FOREIGN PATENT DOCUMENTS

| | | |
|---|---|---|
| BR | DI6804858-0 | 11/2008 |
| BR | DI6805213-8 | 11/2008 |

(Continued)

*Primary Examiner* — Joseph J Hail
*Assistant Examiner* — Shantese L McDonald

(57) ABSTRACT

A system for forming an oral care implement and an oral care implement formed thereby. The system may include a first mold defining a first mold cavity having a first mold cavity axis; first and second injection orifices formed into the first mold and providing passageways directly into the first portion of the first mold cavity, the second injection orifice being spaced apart from the first injection orifice; first and second hot runner sub-systems fluidly coupled to the first and second injection orifices, respectively; wherein the system is configured to dispense the first material into the first portion of the first mold cavity via the first injection orifice, and after passage of a period of time, to subsequently dispense the second material into the first portion of the first mold cavity via the second injection orifice, the second material being injected into the first material to displace the first material.

19 Claims, 9 Drawing Sheets

(56) References Cited

U.S. PATENT DOCUMENTS

| | | | |
|---|---|---|---|
| 5,735,012 A | 4/1998 | Heinzelman et al. | |
| 5,761,759 A * | 6/1998 | Leversby | A46B 5/02 |
| | | | 15/143.1 |
| 5,781,958 A | 7/1998 | Meessmann et al. | |
| 5,798,069 A | 8/1998 | Bertschi et al. | |
| 5,898,967 A | 5/1999 | Wu et al. | |
| 6,062,840 A | 5/2000 | Lee et al. | |
| 6,099,780 A | 8/2000 | Gellert | |
| 6,234,798 B1 | 5/2001 | Beals et al. | |
| 6,276,020 B1 | 8/2001 | Leversby et al. | |
| 6,276,914 B1 | 8/2001 | Sicilia | |
| 6,353,958 B2 | 3/2002 | Weihrauch | |
| 6,394,094 B1 | 5/2002 | McKenna et al. | |
| 6,397,425 B1 | 6/2002 | Szczech et al. | |
| 6,408,476 B1 | 6/2002 | Cann | |
| 6,596,213 B2 | 7/2003 | Swenson | |
| 6,660,272 B2 | 8/2003 | Stvartak et al. | |
| D480,877 S | 10/2003 | Crossman et al. | |
| D482,531 S | 12/2003 | Berg et al. | |
| D483,569 S | 12/2003 | Wong | |
| 6,668,416 B1 | 12/2003 | Georgi et al. | |
| 6,676,541 B2 | 1/2004 | Cavallaro et al. | |
| D485,989 S | 2/2004 | Winkler et al. | |
| 6,687,940 B1 | 2/2004 | Gross et al. | |
| D487,195 S | 3/2004 | Winkler | |
| D490,247 S | 5/2004 | Nanda | |
| 6,919,038 B2 | 7/2005 | Meyer et al. | |
| 6,972,106 B2 | 12/2005 | Huber et al. | |
| 7,083,756 B2 | 8/2006 | Strahler | |
| D531,415 S | 11/2006 | Won | |
| D532,975 S | 12/2006 | Lonngren | |
| 7,240,390 B2 | 7/2007 | Pfenniger et al. | |
| 7,297,303 B2 | 11/2007 | Kraemer | |
| 7,383,619 B2 | 6/2008 | Gross et al. | |
| 7,415,788 B2 | 8/2008 | Little | |
| D582,681 S | 12/2008 | Geiberger et al. | |
| 7,691,309 B2 | 4/2010 | Ebner et al. | |
| D630,436 S | 1/2011 | Winkler | |
| 8,046,864 B2 | 1/2011 | Baertschi et al. | |
| 7,921,499 B2 | 4/2011 | Huber et al. | |
| 8,060,972 B2 | 11/2011 | Geiberger et al. | |
| D658,885 S | 5/2012 | Pereira et al. | |
| D660,002 S | 5/2012 | Smigel et al. | |
| 8,382,208 B2 | 2/2013 | Baertschi et al. | |
| 8,458,846 B2 | 6/2013 | Schamberg et al. | |
| 8,739,351 B2 | 6/2014 | Kling et al. | |
| 9,420,877 B2 * | 8/2016 | Wen | A46D 3/00 |
| 2002/0124864 A1 | 9/2002 | Gross et al. | |
| 2003/0019063 A1 | 1/2003 | Abraham | |
| 2003/0178745 A1 | 9/2003 | Scarabelli et al. | |
| 2004/0113312 A1 * | 6/2004 | Strahler | A46B 5/02 |
| | | | 264/243 |
| 2005/0170113 A1 | 8/2005 | Hill | |
| 2006/0123574 A1 | 6/2006 | Storkel et al. | |
| 2007/0096364 A1 * | 5/2007 | Hahn | B29C 45/1642 |
| | | | 264/255 |
| 2007/0151058 A1 | 7/2007 | Georgi et al. | |
| 2010/0058550 A1 | 3/2010 | Ballmaier et al. | |
| 2010/0101034 A1 | 4/2010 | Huang | |
| 2010/0101037 A1 | 4/2010 | Gross et al. | |
| 2010/0125962 A1 | 5/2010 | Davies et al. | |
| 2012/0192369 A1 | 8/2012 | Mohr et al. | |
| 2012/0258192 A1 | 10/2012 | Novo | |
| 2014/0047656 A1 | 2/2014 | Newman et al. | |
| 2014/0173853 A1 * | 6/2014 | Kirchhofer | B29C 45/1642 |
| | | | 16/430 |
| 2014/0178650 A1 | 6/2014 | Schnurr | |
| 2014/0291891 A1 | 10/2014 | Charnay | |

FOREIGN PATENT DOCUMENTS

| | | |
|---|---|---|
| BR | DI6901285-7 | 4/2009 |
| BR | 30 2012 002739-0 | 5/2012 |
| CN | 3271426D | 7/2002 |
| CN | 3275821D | 7/2002 |
| CN | 3281654D | 8/2002 |
| CN | 3281655D | 8/2002 |
| CN | 3284029D | 8/2002 |
| CN | 3357782D | 9/2003 |
| CN | 3370637D | 9/2003 |
| CN | 3370641D | 10/2003 |
| CN | 3370642D | 10/2003 |
| CN | 3381418D | 10/2003 |
| CN | 3399984D | 4/2004 |
| CN | 3409449D | 4/2004 |
| CN | 3409462D | 5/2004 |
| CN | 3438263D | 9/2004 |
| CN | 3501746D | 3/2005 |
| CN | 3500222D | 5/2005 |
| CN | 3509321D | 5/2005 |
| CN | 3540490D | 9/2005 |
| CN | 3527581 | 5/2006 |
| CN | 3563487 | 9/2006 |
| CN | 300760419D | 2/2007 |
| CN | 300863162D | 12/2007 |
| CN | 301377588 S | 10/2010 |
| CN | 3013775695 S | 10/2010 |
| CN | 301421506 S | 12/2010 |
| CN | 3301517882 S | 4/2011 |
| CN | 301628993 S | 8/2011 |
| CN | 301950638 | 6/2012 |
| CN | 203220069 | 10/2013 |
| CN | 302727947 S | 2/2014 |
| DE | 198 58 102 | 12/1998 |
| DE | 19802048 | 3/2001 |
| DE | 10 2006 005616 | 8/2007 |
| DE | 10 2009 031 397 | 1/2011 |
| EM | 000092069-0001 | 10/2003 |
| EM | 000174537-0001 | 5/2004 |
| EM | 000174537-0003 | 5/2004 |
| EM | 000174701-0001 | 5/2004 |
| EM | 000206065-0010 | 7/2004 |
| EM | 000335286-0001 | 4/2005 |
| EM | 000335286-0002 | 4/2005 |
| EM | 000366984-0001 | 7/2005 |
| EM | 000366984-0002 | 7/2005 |
| EM | 000366984-0003 | 7/2005 |
| EM | 000366984-0004 | 7/2005 |
| EM | 000366984-0005 | 7/2005 |
| EM | 000366984-0006 | 7/2005 |
| EM | 000366984-0007 | 7/2005 |
| EM | 000387667-0001 | 8/2005 |
| EM | 000449806-0001 | 12/2005 |
| EM | 000486105-0001 | 2/2006 |
| EM | 000508023-0006 | 3/2006 |
| EM | 000507561-0001 | 4/2006 |
| EM | 000527163-0004 | 5/2006 |
| EM | 000527163-0005 | 5/2006 |
| EM | 000605480-0002 | 10/2006 |
| EM | 000745260-0001 | 6/2007 |
| EM | 000745260-0002 | 6/2007 |
| EM | 000774070-0001 | 8/2007 |
| EM | 000774070-0002 | 8/2007 |
| EM | 000774070-0005 | 8/2007 |
| EM | 000825526-0001 | 11/2007 |
| EM | 000865746-0001 | 1/2008 |
| EM | 000865746-0002 | 1/2008 |
| EM | 000967674-0001 | 7/2008 |
| EM | 001147870-0001 | 6/2009 |
| EM | 001147870-0002 | 6/2009 |
| EM | 001152151-0002 | 7/2009 |
| EM | 001152151-0005 | 7/2009 |
| EM | 001152151-0006 | 7/2009 |
| EM | 001179337-0001 | 11/2009 |
| EM | 001638636-0001 | 11/2009 |
| EM | 001680711-0001 | 3/2010 |
| EM | 001210926-0003 | 4/2010 |
| EM | 001210926-0004 | 4/2010 |
| EM | 001210926-0006 | 4/2010 |
| EM | 001751207-0001 | 9/2010 |
| EM | 001828310-0001 | 3/2011 |
| EM | 001828310-0002 | 3/2011 |
| EM | 001828310-0004 | 3/2011 |

(56) References Cited

FOREIGN PATENT DOCUMENTS

| | | |
|---|---|---|
| EM | 001280820-0001 | 6/2011 |
| EM | 001290035-0003 | 8/2011 |
| EM | 001290035-0004 | 8/2011 |
| EM | 001975079-0001 | 1/2012 |
| EM | 001975079-0002 | 1/2012 |
| EM | 001975079-0004 | 1/2012 |
| EM | 001975079-0005 | 1/2012 |
| EM | 001975079-0006 | 1/2012 |
| EM | 002012930-0001 | 3/2012 |
| EM | 002012930-0002 | 3/2012 |
| EM | 002015917-0001 | 3/2012 |
| EM | 002047894-0001 | 5/2012 |
| EM | 002155366-0001 | 12/2012 |
| EM | 001362180-0001 | 2/2013 |
| EM | 002212522-0006 | 4/2013 |
| EM | 002212522-0017 | 4/2013 |
| EM | 002212522-0018 | 4/2013 |
| EM | 002212522-0019 | 4/2013 |
| EM | 002212522-0020 | 4/2013 |
| EM | 002241034-0001 | 5/2013 |
| EM | 002478297-0002 | 6/2014 |
| EM | 002478297-0006 | 6/2014 |
| EM | 002510891-0004 | 7/2014 |
| EM | 002510891-0012 | 7/2014 |
| EM | 002510891-0017 | 7/2014 |
| EM | 002510891-0021 | 7/2014 |
| EM | 002510891-0027 | 7/2014 |
| EM | 002510891-0029 | 7/2014 |
| EP | 0 668 140 | 2/1995 |
| EP | 0 721 832 | 7/1996 |
| EP | 0949053 | 10/1999 |
| FR | 2901505 | 4/2009 |
| FR | 2953159 | 4/2012 |
| FR | 2901504 | 10/2012 |
| GB | 3005668 | 7/2002 |
| JP | H07327737 | 12/1995 |
| JP | D1105978 | 2/2001 |
| JP | D1108572 | 3/2001 |
| JP | D1127771 | 10/2001 |
| JP | 2002-153322 | 5/2002 |
| JP | D1149993 | 6/2002 |
| JP | 2003-025376 | 1/2003 |
| JP | 2004-114482 | 4/2004 |
| JP | D1259839 | 11/2005 |
| JP | 2006224547 | 8/2006 |
| JP | D1321142 | 1/2008 |
| JP | D1368612 | 7/2009 |
| KR | 300471618.0000 | 11/2007 |
| RU | 2143975 | 1/2000 |
| RU | 62667 | 6/2007 |
| RU | 62887 | 6/2007 |
| RU | 63214 | 7/2007 |
| RU | 79788 | 10/2011 |
| WO | WO 1999/55514 | 11/1999 |
| WO | 2000/064306 | 11/2000 |
| WO | WO 2001/17391 | 3/2001 |
| WO | WO 2001/17392 | 3/2001 |
| WO | WO 2001/29128 | 4/2001 |
| WO | 2005/002826 | 5/2005 |
| WO | WO 2005/122827 | 12/2005 |
| WO | WO 2006/125597 | 11/2006 |
| WO | WO 2007/053034 | 5/2007 |
| WO | 2011/135318 | 11/2011 |
| WO | WO 2012/176741 | 12/2012 |
| WO | WO 2013/031685 | 3/2013 |

* cited by examiner

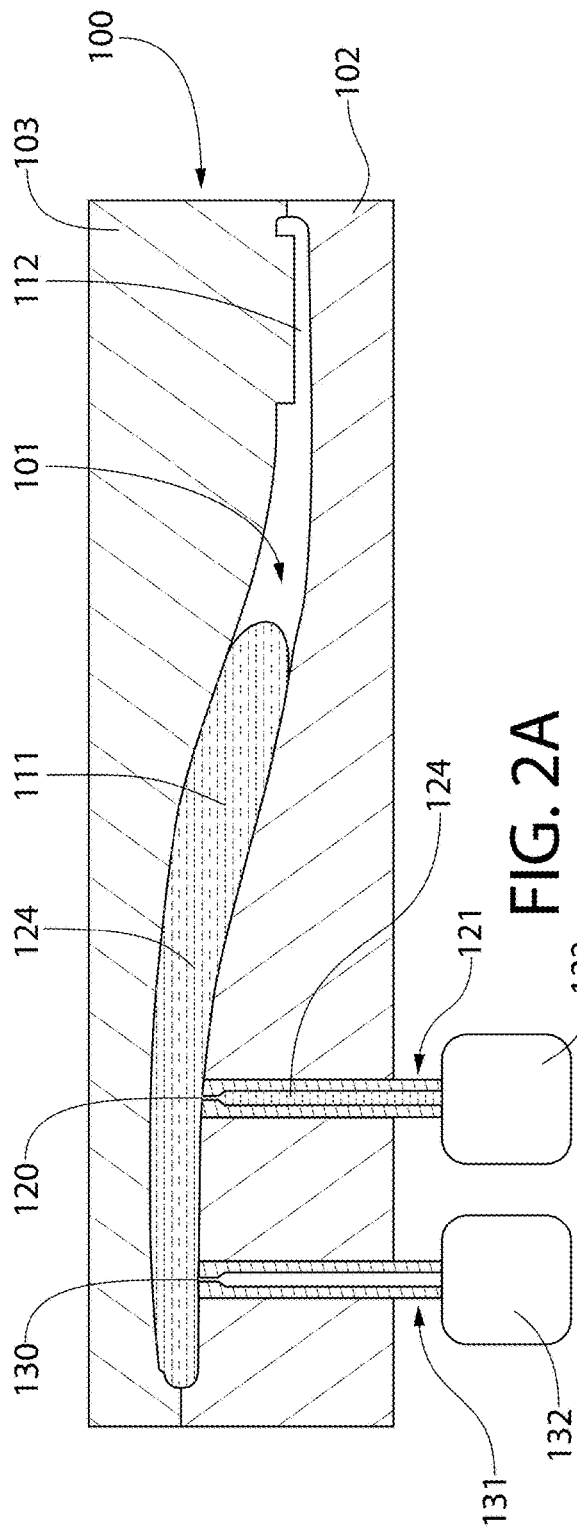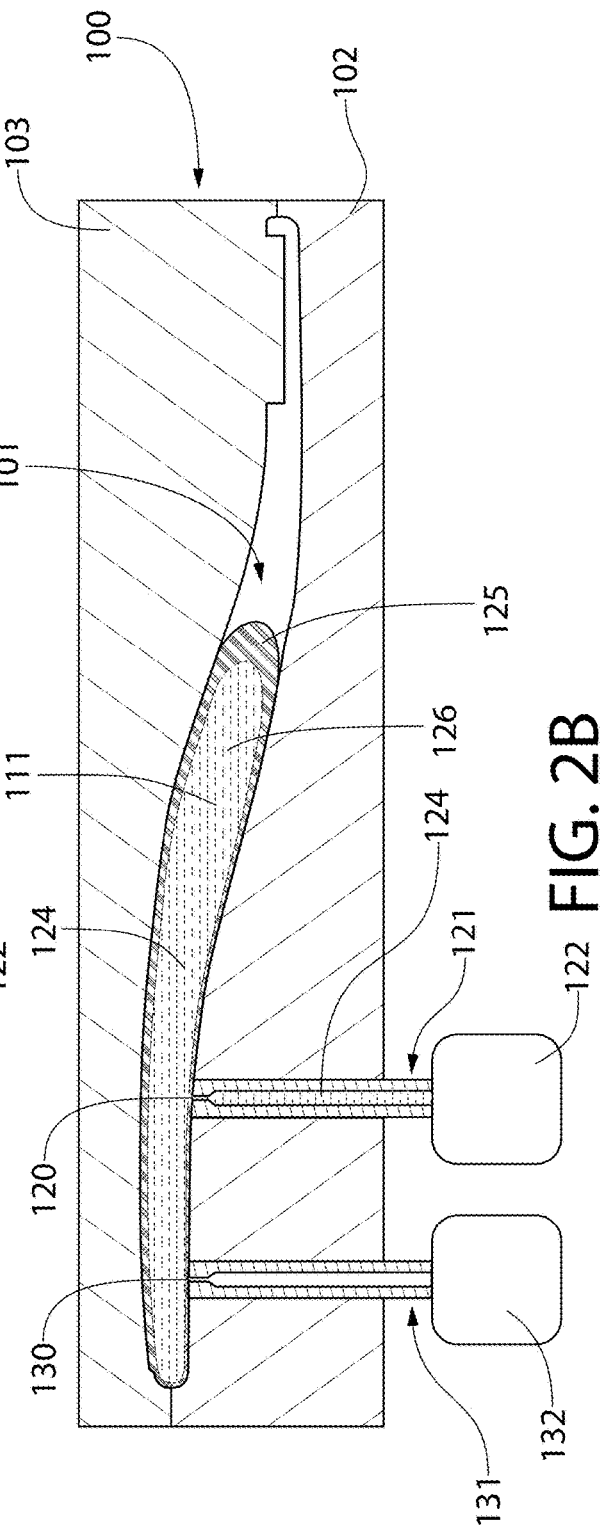

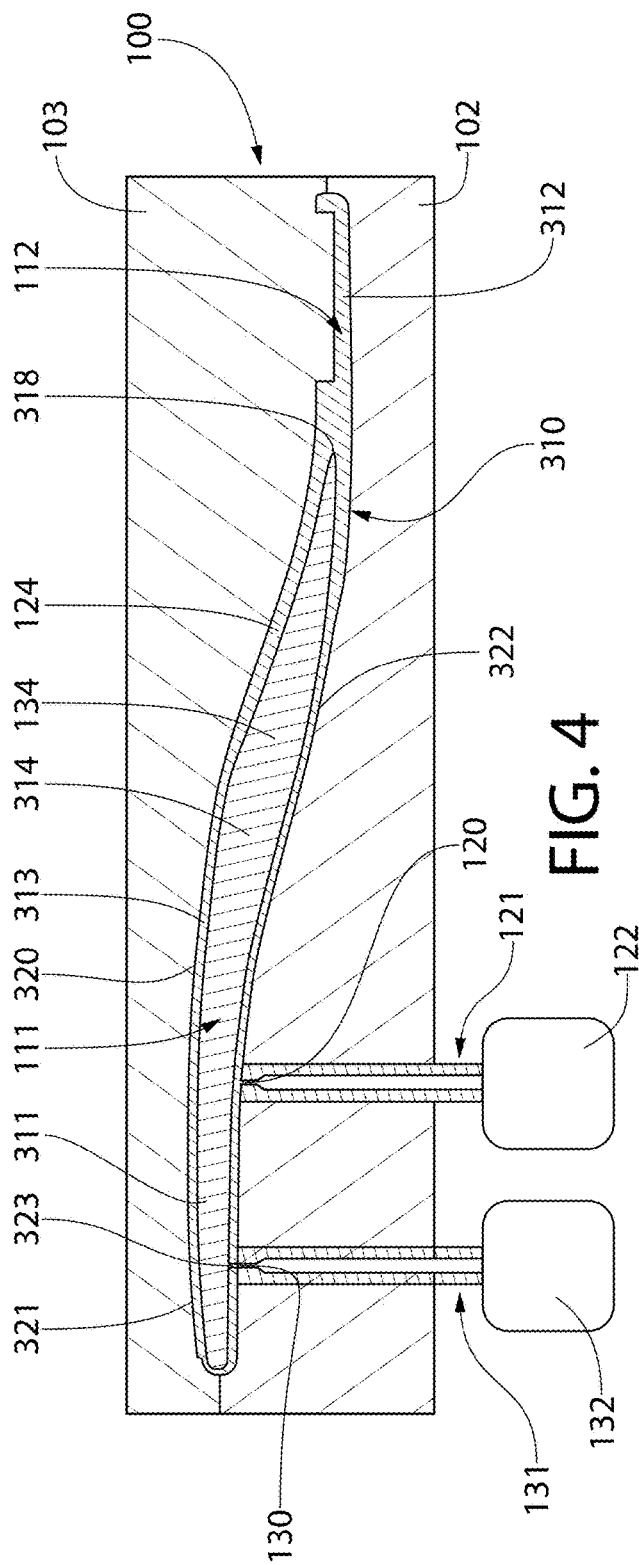
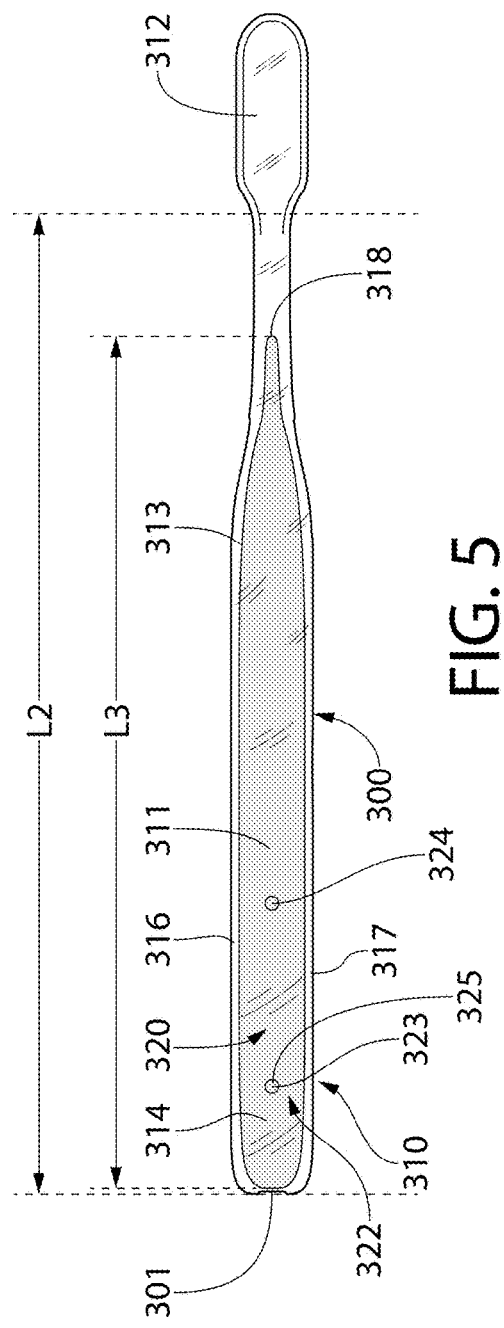
FIG. 4
FIG. 5

SYSTEM AND METHOD FOR FORMING AN ORAL CARE IMPLEMENT

CROSS-REFERENCE TO RELATED APPLICATIONS

The present application is a divisional of U.S. patent application Ser. No. 14/611,879, filed Feb. 2, 2015, the entirety of which is incorporated herein by reference.

BACKGROUND

Forming injection molded parts by a sandwich or co-injection method has previously been accomplished. One of the techniques currently used for sandwich molding involves injecting a first material into a mold cavity, and subsequently injecting a second material into the mold cavity at the same injection point. The second material displaces the first material so that the second material forms a core of the injection molded part and the first material forms a shell of the injection molded part. Often, the first material is injected through the injection point again after completion of injection of the second material so that the entire exposed outer surface of the injection molded part is formed of the first material. The problem with existing sandwich molding techniques is that the technology that facilitates the injection is extremely expensive and complicated because a single valve gate tip must be capable of being used with multiple different materials at different times. Thus, the valve gate tip must be capable of opening and closing ports to facilitate separate injection of the first and second materials. Thus, a need exists for a simplified method and system for forming injection molded parts, and particularly oral care implements such as toothbrushes, using a sandwich method.

BRIEF SUMMARY

The present invention may be directed, in one aspect, to a method of forming an oral care implement comprising a base structure having a handle portion and a head portion. The method includes providing a mold having a mold cavity. The mold cavity has a first portion that corresponds to and is used to form the handle portion of the base structure and a second portion that corresponds to and is used to form the head portion of the base structure. The method further includes injecting a first material into the first portion of the mold cavity via a first injection orifice and, after a predetermined period of time has elapsed, injecting a second material into the first portion of the mold cavity via a second injection orifice. The injection of the first and second materials may be achieved solely with hot runner systems. The second material will be injected into the first material, and will form the base structure such that the second material forms a core component and the first material forms a shell component of the base structure.

In one embodiment, the invention can be a method of forming an oral care implement comprising a base structure having a handle portion and a head portion, the method comprising: a) providing a first mold that defines a first mold cavity, the first mold cavity comprising a first portion that corresponds to the handle portion of the base structure and a second portion that corresponds to the head portion of the base structure; b) injecting a first material into the first portion of the first mold cavity via a first injection orifice with a first hot runner sub-system, the first injection orifice forming a first passageway into the first portion of the first mold cavity; and c) injecting a second material into the first portion of the first mold cavity via a second injection orifice with a second hot runner sub-system, the second injection orifice forming a second passageway into the first portion of the first mold cavity, the second material being injected into the first material to displace the first material, thereby forming the base structure such that the second material forms a core component of the base structure and the first material forms a shell component of the base structure that surrounds the core component.

In another embodiment, the invention can be a system for forming an oral care implement comprising a base structure having a handle portion and a head portion, the system comprising: a first mold defining a first mold cavity having a first mold cavity axis, the first mold cavity comprising a first portion that corresponds to the handle portion of the base structure and a second portion that corresponds to the head portion of the base structure; a first injection orifice formed into the first mold and providing a first passageway directly into the first portion of the first mold cavity; a second injection orifice formed into the first mold and providing a second passageway directly into the first portion of the first mold cavity, the second injection orifice spaced apart from the first injection orifice; a first hot runner sub-system fluidly coupled to the first injection orifice; a second hot runner sub-system fluidly coupled to the second injection orifice; and wherein the system is configured to dispense the first material into the first portion of the first mold cavity via the first injection orifice with the first hot runner sub-system, and after passage of a predetermined period of time, to subsequently dispense the second material into the first portion of the first mold cavity via the second injection orifice with the second hot runner sub-system, the second material being injected into the first material to displace the first material, thereby forming the base structure such that the second material forms a core component of the base structure and the first material forms a shell component of the base structure that surrounds the core component.

In yet another embodiment, the invention can be an oral care implement comprising: a base structure comprising a handle portion and a head portion, the handle portion having an outer surface; the handle portion comprising a first material that forms a shell component and a second material that forms a core component, the shell component substantially surrounding the core component; the handle portion having a first gate point on the outer surface that corresponds to an injection location for the first material and a second gate point on the outer surface that corresponds to an injection location for the second material, the first and second gate points being spaced apart from one another.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2A is a schematic cross-sectional view of the first mold of FIG. 1, wherein a first material is being injected into the first mold cavity with the first hot runner sub-system.

FIG. 2B is a schematic cross-sectional view of the first mold of FIG. 1, wherein a portion of the first material has hardened in the first mold cavity.

FIG. 4 is a schematic cross-sectional view of the first mold of FIG. 1 illustrating a base structure of an oral care implement formed in the first mold cavity.

FIG. 5 is a rear view of the base structure of the oral care implement formed in the first mold of FIG. 1.

DETAILED DESCRIPTION

Figure 1:
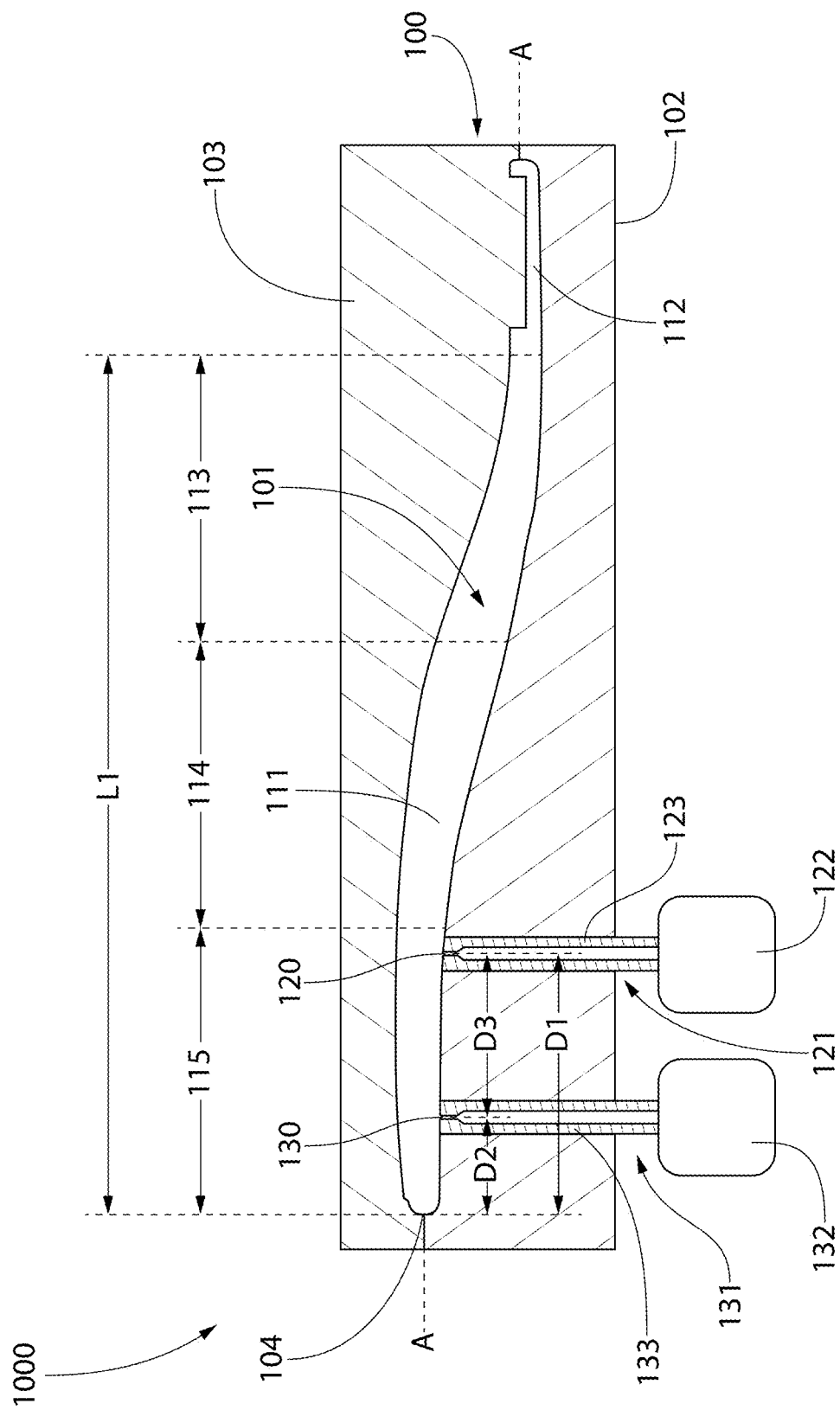
FIG. 1 is a schematic cross-sectional view of a first mold defining a first mold cavity and coupled to first and second hot runner sub-systems.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Figure 10:
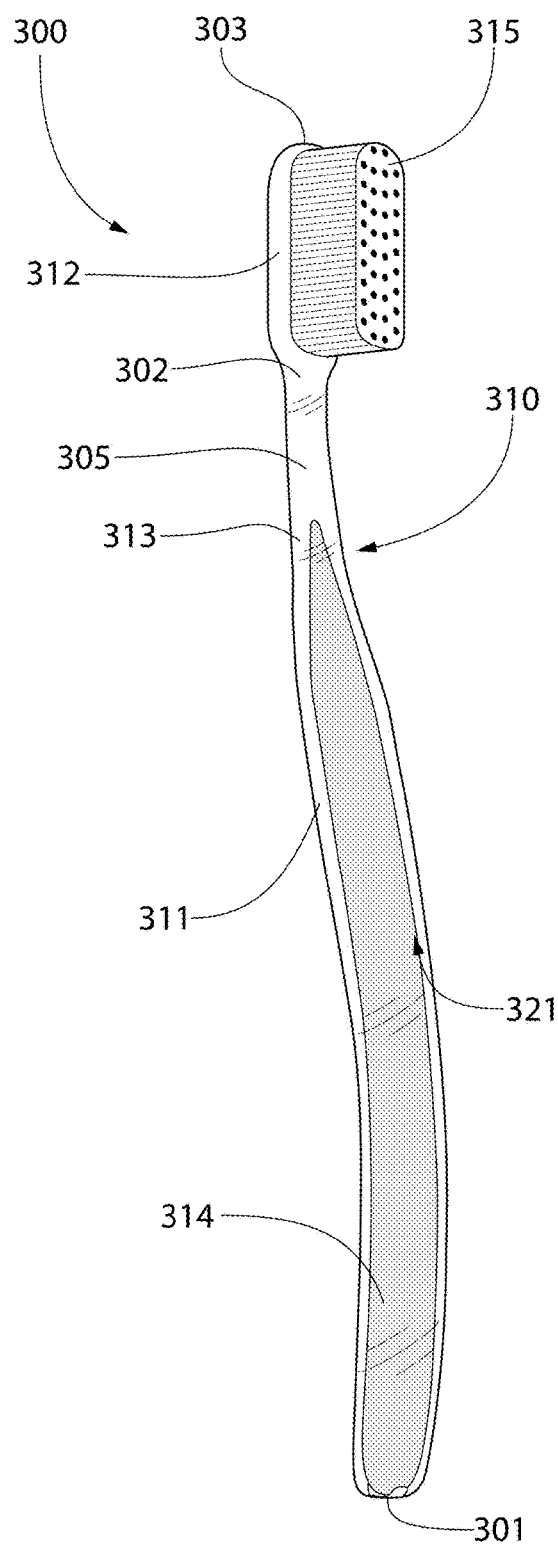
FIG. 10 is a front perspective view of the oral care implement formed in the first and second molds.
Figure 11:
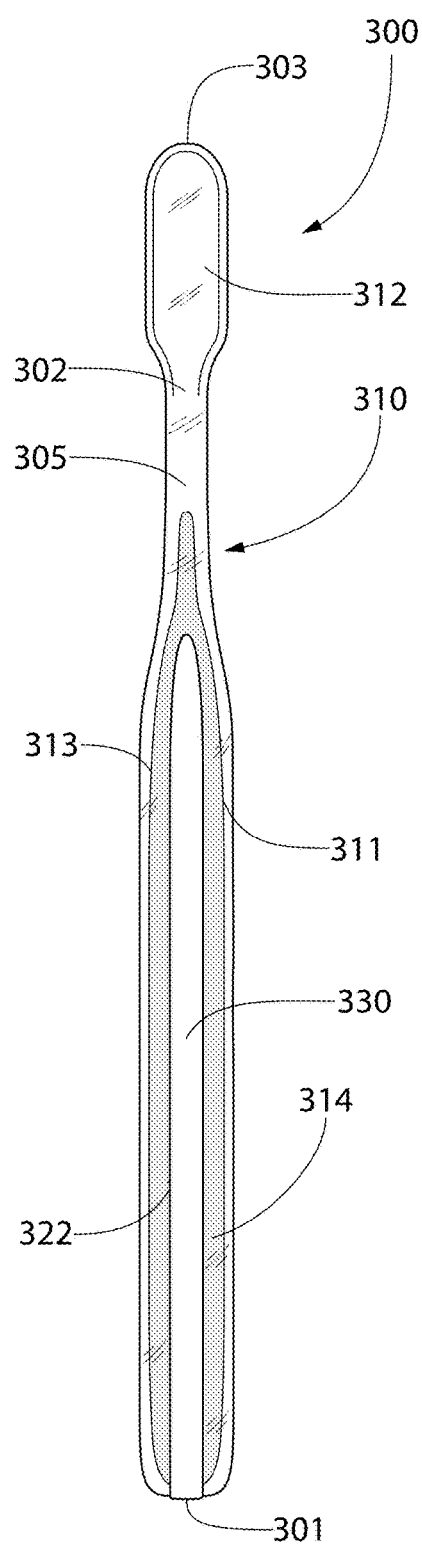
FIG. 11 is a rear view of the oral care implement of FIG. 10.

A method of forming an oral care implement and the system used to form the oral care implement will be described herein. Referring to FIGS. 10 and 11, one embodiment of an oral care implement 300 that is formed using the method and system described herein is illustrated. As will be better understood from the description below, the oral care implement 300 generally comprises a base structure 310 and an elastomeric overmold 330. In certain embodiments the elastomeric overmold 330 may form a grip to prevent slippage and enhance comfort during use of the oral care implement 300, although the elastomeric overmold 330 may also be omitted in certain embodiments as desired. Although in the exemplified embodiment the elastomeric overmold 330 is only illustrated in a line on the rear surface of the handle of the base structure 310, the invention is not to be so limited. In other embodiments the elastomeric overmold 330 may extend onto the front surface of the base structure 310 to form a forefinger and thumb grip to increase comfort and prevent slippage during use. Furthermore, the elastomeric overmold 330 may extend onto the rear surface of the head of the base structure 310 to operate as a tongue and soft tissue cleanser. The elastomeric overmold 330 may also extend onto the front surface of the head of the base structure 310 to operate as a rubber tooth polishing member. The elastomeric overmold 330 may be a single unitary piece formed via a single shot in an injection mold or may include several discontinuous or separated segments formed of the elastomeric material via multiple shots in an injection mold. Furthermore, various textures, protrusions, channels, ridges, or the like may be formed as part of the elastomeric overmold 330.

In certain exemplified embodiments, the base structure 310 comprises a handle portion 311 and a head portion 312. The handle portion 311 of the base structure 310 extends from a proximal end 301 of the oral care implement 300 to a distal end 302 of the handle portion 311. The head portion 312 of the base structure 310 extends from the distal end 302 of the handle portion 311 to a distal end 303 of the head portion 312. Thus, in the exemplified embodiment the handle portion 311 includes the portion of the oral care implement 300 that is gripped during use and a neck 305 of the oral care implement 300 that forms the transition region between the handle portion 311 and the head portion 312.

In the exemplified embodiment, a plurality of tooth cleaning elements 315 are coupled to and extend from the head portion 312 of the base structure 310. The term "tooth cleaning elements" is used in a generic sense to refer to any structure that can be used to clean, polish, or wipe the teeth and/or soft oral tissue (e.g. tongue, cheek, gums, etc.) through relative surface contact. Common examples of "tooth cleaning elements" include, without limitation, bristle tufts, filament bristles, fiber bristles, nylon bristles, spiral bristles, rubber bristles, elastomeric protrusions, flexible polymer protrusions, combinations thereof and/or structures containing such materials or combinations. The tooth cleaning elements may include tapered bristles, non-tapered (i.e., end rounded) bristles, and combinations thereof. Any combination of the various types of tooth cleaning elements may be used on the oral care implement 300 in different embodiments. In embodiments that use elastomeric elements as one or more of the tooth cleaning elements 315, suitable elastomeric materials may include any biocompatible resilient material suitable for uses in an oral hygiene apparatus. To provide optimum comfort as well as cleaning benefits, the elastomeric material of any such tooth or soft tissue engaging elements may have a hardness property in the range of A8 to A25 Shore hardness. One suitable elastomeric material is styrene-ethylene/butylene-styrene block copolymer (SEBS) manufactured by GLS Corporation. Nevertheless, SEBS material from other manufacturers or other materials within and outside the noted hardness range could be used. The tooth cleaning elements 315 may be coupled to the head portion 312 of the base structure 310 using any technique known in the art, such as stapling, anchor free tufting, in-mold tufting, AMR, or the like. The invention is not to be limited by the manner in which the tooth cleaning elements 315 are coupled to the head portion 312 in all embodiments.

The handle portion 311 of the base structure 310 comprises a shell component 313 formed of a first material and a core component 314 formed of a second material, the core component 313 being substantially entirely surrounded or enclosed by the shell component 313. Thus, the core component 314 appears to float within the shell component 313. The shell component 313 may be formed of a transparent material and the core component 314 may be formed of an opaque material so that the core component 314 is visible through the shell component 313 to achieve a desirable aesthetic effect. As will be described below, in certain embodiments the base structure 310 is formed using solely hot runner technologies as opposed to cold runner technologies. In certain embodiments the elastomeric overmold 330 that forms the grip can be formed onto the base structure 310 using either hot runner or cold runner technologies.

Referring to FIG. 1, an embodiment of the present invention will be described as a system 1000 and method of forming the oral care implement 300 described above. FIG. 1 depicts a first mold 100 that defines a first mold cavity 101 that is used to form the base structure 310 of the oral care implement 300. The first mold cavity 101 generally extends along a first mold cavity axis A-A. In the exemplified embodiment, the first mold 100 comprises a first mold portion 102 and a second mold portion 103 that collectively define the first mold cavity 101. In this embodiment, the first mold portion 102 may be a static or non-movable mold portion and the second mold portion 103 may be a movable mold portion that permits the first and second mold portions 102, 103 to become spaced from one another for removal of the base structure 310 or the oral care implement 300 after manufacture thereof. Of course, the invention is not to be limited by the first mold 100 comprising only two mold portions or mold halves, and the first mold 100 may comprise three or more mold portions in other embodiments.

In the exemplified embodiment, the first mold cavity 101 comprises a first portion 111 that corresponds to the handle portion 311 of the base structure 310 and a second portion 112 that corresponds to the head portion 312 of the base structure 310. Thus, the first portion 111 of the first mold cavity 101 defines the shape of the handle portion 311 of the base structure 310 and the second portion 112 of the first mold cavity 101 defines the shape of the head portion 312 of the base structure 310. Stated another way, the shape of the first portion 111 of the first mold cavity 101 is the same as the shape of the handle portion 311 of the base structure 310 and the shape of the second portion 112 of the first mold cavity 101 is the same as the shape of the head portion 312 of the base structure 310. Although there is no definitive starting and ending points for the first and second portions 111, 112 of the first mold cavity 101 because the first mold cavity 101 is a single uninterrupted cavity, the boundaries of each should be readily understood based on the distinction between the head portion 312 and the handle portion 311 of the oral care implement 300. As will be described below, molten or liquid materials are injected into the first mold cavity 101 to completely fill the volume of the first mold cavity 101, and, upon hardening, the materials collectively form the base structure 310 of the oral care implement 300.

The first mold 100 comprises a first injection orifice 120 that forms a first passageway into the first portion 111 of the first mold cavity 110 and a second injection orifice 130 that forms a second passageway into the first portion 111 of the first mold cavity 110. The first and second orifices 120, 130 are formed into the first mold 100 at a location that is transversely aligned with the first portion 111 of the first mold cavity 110 such that a transverse plane that is perpendicular to the first mold cavity axis A-A and that intersects the first injection orifice 120 and a transverse plane that is perpendicular to the first mold cavity axis A-A and that intersects the second injection orifice 130 intersects or passes through the first portion 111 of the first mold cavity 110. The term transverse plane means that the plane would divide the first mold cavity 110 into axial sections rather than an axial plane that would divide the first mold cavity 110 into upper and lower sections or left and right sections.

The first and second injection orifices 120, 130 are separate orifices that form separate passageways into the first portion 111 of the first mold cavity 110. Thus, the first and second injection orifices 120, 130 are spaced apart from one another along the first mold cavity axis A-A. In certain embodiments the first and second injection orifices 120, 130 may be in axial alignment with one another and/or adjacent to one another. In the exemplified embodiment, each of the first and second injection orifices 120, 130 is formed into the first mold portion 102 of the first mold 100. This may result in ease of use when the first mold portion 102 is the static or non-movable mold half as described herein above. In certain embodiments, the first and second injection orifices 120, 130 may be aligned along a first plane that comprises the first mold cavity axis A-A and divides the first mold cavity 110 into left and right sections. Furthermore, in certain embodiments the first and second injection orifices 120, 130 may be located on the same side of a second plane that comprises the first mold cavity axis A-A, is orthogonal to the first plane, and divides the first mold cavity 110 into upper and lower sections. In the exemplified embodiment, the first injection orifice 120 has a first transverse cross-sectional area and the second injection orifice 130 has a second transverse cross-sectional area, the first and second transverse cross-sectional areas being substantially the same. However, the invention is not to be so limited in all embodiments and in certain other embodiments one of the first and second transverse cross-sectional areas of the first and second injection orifices 120, 130 may be larger than the other.

In the exemplified embodiment, the first portion 111 of the first mold cavity 101 comprises a first axial section 113 having a first length, a second axial section 114 having a second length, and a third axial section 115 having a third length. In certain embodiments, the first, second, and third lengths may be the same such that the first portion 111 of the first mold cavity 101 can be conceptually divided into three axial sections of equal length. In the exemplified embodiment, the first axial section 113 of the first portion 111 of the first mold cavity 101 is adjacent to the second portion 112 of the first mold cavity 101, the second axial section 114 of the first portion 111 of the first mold cavity 101 is positioned in between the first and third axial sections 113, 115 of the first portion 111 of the first mold cavity 101, and the third axial section 115 of the first portion 111 of the first mold cavity 101 comprises a proximal end 104 of the first portion 111 of the first mold cavity 101.

In the exemplified embodiment, each of the first and second injection orifices 120, 130 or injection points is located within the third axial section 115 of the first portion 111 of the first mold cavity 101. In this embodiment, the first and second orifices 120, 130 are formed into the first mold 100 at a location that is transversely aligned with the third axial section 115 of the first portion 111 of the first mold cavity 110. Stated another way, a transverse plane that is perpendicular to the first mold cavity axis A-A and that intersects the first injection orifice 120 intersects or passes through the third axial section 115 of the first portion 111 of the first mold cavity 110. Furthermore, a transverse plane that is perpendicular to the first mold cavity axis A-A and that intersects the second injection orifice 130 intersects or passes through the third axial section 115 of the first portion 111 of the first mold cavity 110.

Thus, in the exemplified embodiment each of the first and second injection orifices 120, 130 provides a direct passageway into the third axial section 115 of the first portion 111 of the first mold cavity 101. As a result, molten or liquefied material that is injected through the first and second injection orifices 120, 130 during manufacturing via an injection molding process will be injected directly into the third axial section 115 of the first portion 111 of the first mold cavity. Of course, the invention is not to be so limited in all embodiments and in certain other embodiments one of the first and second orifices 120, 130 may be located at (or aligned with) one of the first, second, and third axial sections 113, 114, 115 and the other of the first and second injection orifices 120, 130 may be located at (or aligned with) another one of the first, second, and third axial sections 113, 114, 115. Thus, for example, the first injection orifice 120 may be located at the third axial section 115 and the second injection orifice 130 may be located at the second axial section 114. Alternatively, both of the first and second injection orifices 120, 130 may be located at one of the first or second axial sections 113, 114. Thus, alternatives to the embodiment exemplified are possible within the scope of the disclosure set forth herein.

Positioning the first and second injection orifices 120, 130 adjacent and near one another (such as in the same of the first, second, and third axial sections 113-115 as described above) facilitates the method described herein and better enables the second injected material to form the core component 314 of the base structure 310 of the oral care implement 300. As stated herein, indicating, for example, that the first injection orifice 120 is located at the third axial section 115 means that material that is injected into the first mold cavity 101 via the first injection orifice 120 will flow directly into the third axial section 115 of the first portion 111 of the first mold cavity 101 even though the material may later flow into one of the other axial sections because the first, second, and third axial sections 113-115 are in fluid communication with one another. The location of the injection orifices 120, 130 relative to the axial sections 113-115 is the location at which the material will first enter into the first mold cavity 101.

Although described above and illustrated with three axial sections 113-115, in certain embodiments the first portion 111 of the first mold cavity 101 may be divided into two axial sections of equal length. In such an embodiment, the first and second injection orifices 120, 130 may both be aligned with the axial section that comprises the proximal end 104 of the first portion 111 of the first mold cavity 101 and that is furthest from the second portion 112 of the first mold cavity 101. In certain embodiments both of the first and second injection orifices 120, 130 are configured to inject a liquefied or molten material into the first portion 111 of the first mold cavity 101 at a location that is closer to the proximal end 104 of the first portion 111 of the first mold cavity 101 than to the second portion 112 of the first mold cavity 101.

In the exemplified embodiment, the first injection orifice 130 is spaced a first distance D1 from the proximal end 104 of the first mold cavity 101 and the second injection orifice 130 is spaced a second distance D2 from the proximal end 104 of the first mold cavity 101, the first D1 distance being greater than the second distance D2. However, the invention is not to be so limited in all embodiments and in certain other embodiments the locations of the first and second injection orifices 120, 130 may be swapped so that the second injection orifice 130 is spaced a greater distance from the proximal end 104 of the first mold cavity 101 than the first injection orifice 120. In certain embodiments, the first and second injection orifices 120, 130 may be spaced apart from one another by a distance D3 that is between 20 mm and 50 mm, more specifically between 30 mm and 40 mm, and still more specifically approximately between 36 mm and 38 mm. Of course, the invention is not to be so limited in all embodiments and the distance between the first and second injection orifices 120, 130 may fall outside of the ranges noted above in some embodiments.

The first and second injection orifices 120, 130 should in some embodiments be spaced near enough to one another to ensure that the material that is injected second is injected directly into the material that is injected first. Thus, the material that is injected second is not injected into empty space within the first mold cavity 101, but rather is injected into regions of the first mold cavity 101 that are already filled with the material that is injected first. In this manner and as will be described in more detail below, the material that is injected second is injected into the material that is injected first and displaces the material that is injected first, thereby causing the material that is injected first to flow into the previously empty regions of the first mold cavity 101 and into peripheral regions of the mold cavity 101.

In the exemplified embodiment, both of the first and second injection orifices 120, 130 are located closer to the proximal end 104 of the first mold cavity 101 than to the second portion 112 of the first mold cavity 101. In certain embodiments, a length L2 of the handle portion 311 of the base structure 310 (FIG. 5), and also the length L1 of the first portion 111 of the first mold cavity 101 that is equal to the sum of the lengths of the first, second, and third axial sections 113-115, may be between 150 mm and 170 mm, more specifically between 155 mm and 165 mm, and still more specifically approximately 160 mm. In certain embodiments, a ratio of the length L2 of the handle portion 311 of the base structure 310 (and also the length L1 of the first portion 111 of the first mold cavity 101) to the distance D3 measured between the first and second injection orifices 120, 130 is between 3:1 and 8:1, and more specifically between 4:1 and 5:1.

In the exemplified embodiment, a first hot runner sub-system 121 is fluidly coupled to the first injection orifice 120 and a second hot runner sub-system 131 is fluidly coupled to the second injection orifice 130. The first hot runner sub-system 121 extends from a first source of material 122 to the first injection orifice 120 and is fluidly coupled to both. The second hot runner sub-system 131 extends from a second source of material 132 and the second injection orifice 130 and is fluidly coupled to both. The first source of material 122 contains a first material 124 therein and the second source of material 132 contains a second material 134 therein. In certain embodiments, the first and second sources of material 122, 132 may be hoppers or the like that contain plastic granules of the first and second materials 124, 134 that are liquefied during the injection molding process using a reciprocating screw and/or heat. The first hot runner sub-system 121 comprises a first hot runner nozzle 123 having a first gate that is positioned within the first mold portion 102 and is fluidly coupled to the first injection orifice 120. The second hot runner sub-system 131 comprises a second hot runner nozzle 133 having a second gate that is positioned within the first mold portion 102 and is fluidly coupled to the second injection orifice 130.

As discussed in more detail below, the first and second hot runner sub-systems 121, 131 comprise all of the conduits, pipes, channels, pumps, valves, and the like that are required to flow the first and second materials 124, 134 from the first and second sources of material 122, 132 to the first mold cavity 101. In some embodiments, the first and second hot runner sub-systems 121, 131 are simply channels formed into the mold 100 that are heated. In other embodiments the first and second hot runner sub-systems 121, 131 may include an additional heated manifold plate that is coupled to the first mold 100. Furthermore, a processor may be coupled to the components of the first and second hot runner sub-systems 121, 131 to automate the injection processes in some embodiments so that manufacture of the base structure 310 of the oral care implement 300 within the first mold cavity 101 may be completely automated.

The first and second hot runner sub-systems 121, 131 are fluidly isolated and separated from one another. Thus, only the first material 124 flows through the first hot runner sub-system 121 and only the second material 134 flows through the second hot runner sub-system 131. Stated another way, the first material 124 does not flow through the second hot runner sub-system 131 or through the second injection orifice 130 and the second material 134 does not flow through the first hot runner sub-system 121 or through the first injection orifice 120. Rather, during operation as will be described below, the first material 124 flows from the first source of material 122, through the first hot runner sub-system 121, through the first injection orifice 120, and into the first portion 111 (and more specifically the third axial section 115 of the first portion 111) of the first mold cavity 101. The second material 134 flows from the second source of material 132, through the second hot runner sub-system 131, through the second injection orifice 130, and into the first portion 111 (and more specifically the third axial section 115 of the first portion 111) of the first mold cavity 101. The first and second hot runner sub-systems 121, 131 may extend a greater length than that illustrated as desired depending on spacing in the manufacturing location and other factors.

Although the term "hot runner" is a term of art, it will be briefly described herein below. In injection molding technologies, the material that is injected into the mold cavity to form the injection molded component flows through a "runner," which is simply a conduit, channel, and/or nozzle that provides a pathway from the source of the material into the mold cavity. In hot runner technologies, the conduit/channel and nozzle are heated so that the material therein remains permanently flowable and does not cool and harden within this conduit/channel and nozzle. The heating can be accomplished via internal heating by placing one or more heater components within the runners/conduits or by externally heating the runners/conduits. The hot runner sub-system and its component parts described herein may be temperature controlled automatically using a processor and software or manually by an operator/user. In cold runner technologies, the conduit/channel is not heated so that material therein cools over time, resulting in excess material or sprue that must be separated from the injection molded component in a separate manufacturing step. Specifically, in such embodiments when the injection molded component is removed from the mold cavity, the sprue remains attached to the injection molded component and must be separated therefrom. This does not occur in hot runner technologies because only the material that is injected into the mold cavity is allowed to cool and harden. All of the material within the hot runners remains heated and liquefied.

In the exemplified embodiment, both the first and second hot runner sub-systems 121, 131 are heated conduits that extend from the first and second sources 122, 132, respectively, to the first and second injection orifices 120, 130, respectively. Thus, at least with regard to the injection of the first and second materials 124, 134 to form the base structure 310 of the oral care implement 300, the system includes no cold runners. Thus, during the manufacture of the base component 310 of the oral care implement 300, there is no sprue but rather any material that is in the runner sub-system but that does not get injected into the first mold cavity 101 remains heated and in flowable/liquefied/molten form.

Figure 3:
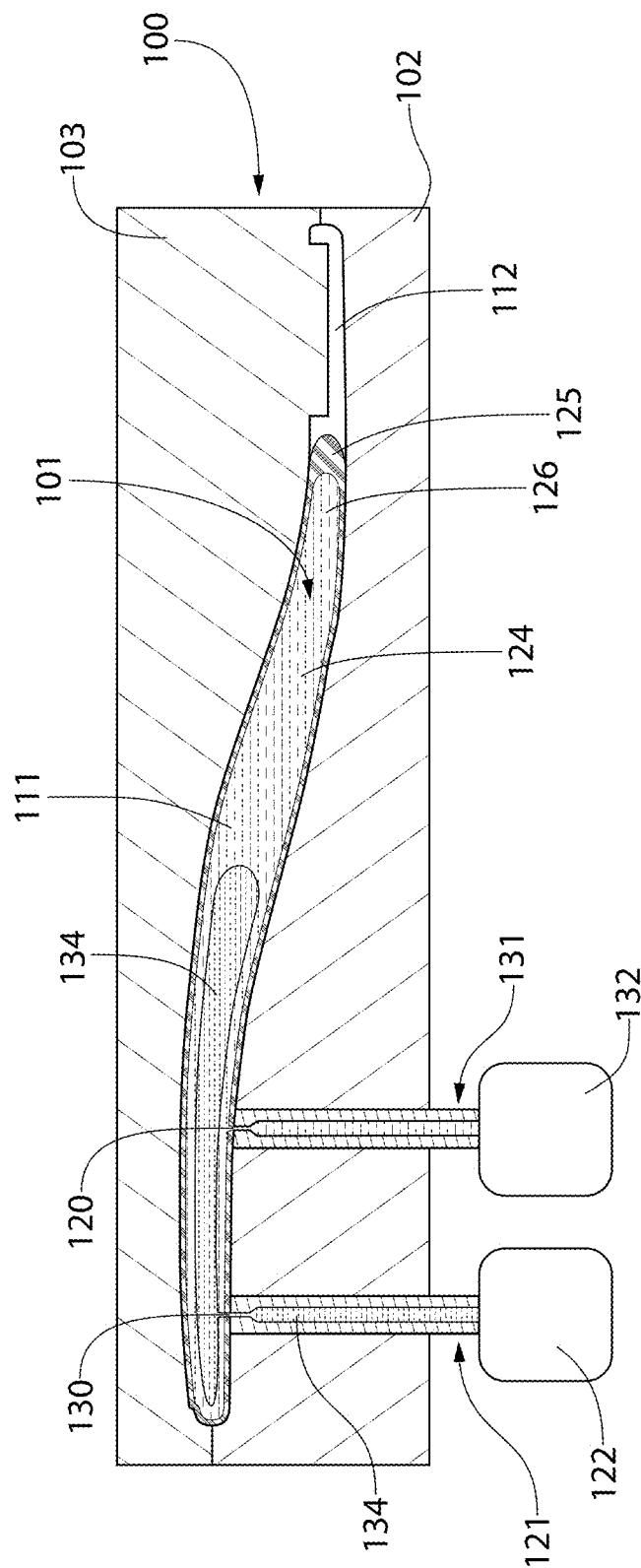
FIG. 3 is a schematic cross-sectional view of the first mold of FIG. 1, wherein a second material is being injected into the first mold cavity with the second hot runner subsystem.

Referring to FIGS. 2A-3, the method of forming the oral care implement 300 using the first mold 100 will be described. The method will first be described with reference to FIG. 2A. The first step in the manufacturing process is to inject the first material 124 into the first portion 111 of the first mold cavity 101 via the first injection orifice 120 with the first hot runner sub-system 121. Specifically, the first material 124 flows from the first source 122, through the first hot runner sub-system 121, through the first injection orifice 120, and into the first portion 111 of the first mold cavity 101. As will be described in more detail below, the first material 124 will form the shell component 313 of the base structure 310 of the oral care implement 300. In certain embodiments, the first material 124 may be a transparent copolyester such as BR003. Of course, the invention is not to be so limited in all embodiments. In certain other embodiments the first material 124 may be transparent or translucent, and the first material may be polypropylene, styrene acrylonitrile (SAN), polyethylene, polyamide, cellulosic, acrylic, ABS, or other hard plastic materials that are commonly used in toothbrush manufacture. In still other embodiments the first material 124 may be opaque rather than translucent. Thus, variations in the color, transparency, and material of the first material 124 are possible within the scope of the disclosure set forth herein.

The first material 124 is injected into the first mold cavity 101 until a desired amount of the first material 124 is located in the first mold cavity 101. In certain embodiments, the first mold cavity 101 may have a first volume and the amount of the first material 124 that is injected into the first mold cavity 101 may have a second volume that is less than the first volume. In certain embodiments the second volume may be between 60% and 80% of the first volume, between 65% and 75% of the first volume, or approximately 70% of the first volume. In certain embodiments the first volume may be between 10-13 $cm^3$, more specifically between 11-12 $cm^3$, and still more specifically approximately 11.581 $cm^3$. However, the exact numerical value of the first volume is dependent on the dimensions (i.e., length, width, thickness) of the oral care implement being formed in the first mold cavity 101 and may be greater or less than the value disclosed herein in other embodiments.

After the desired amount of the first material 124 is injected into the first mold cavity 101, a predetermined period of time is allowed to pass to enable the first material 124 to begin to cool and harden within the first mold cavity 101. The cooling period can be sped up by running cold water through the first mold 100 around the first mold cavity 101 if desired. This predetermined period of time may be changed depending on the desired respective thicknesses of the core and shell components 313, 314 of the handle portion 311 of the base structure 310. In certain embodiments, the predetermined period of time may be three seconds, four seconds, five seconds, six, seconds, seven seconds, eight seconds, nine seconds, ten seconds, or more. In one embodiment the predetermined period of time is three seconds or more. The more time that passes after injection of the first material 124 and before injection of the second material 134, the more volume of the first material 124 that has hardened and the greater the thickness of the shell component 313 and the smaller the thickness of the core component 314 of the fully formed base structure 310. FIG. 2B illustrates the first material 124 in the mold cavity 101 after a predetermined period of time has passed such that outer portions 125 of the first material 124 have begun to harden while inner portions 126 of the first material 124 remain liquefied and flowable.

Referring now to FIG. 3, after the predetermined period of time has passed, the second material 134 is injected into the first portion 111 of the first mold cavity 101 via the second injection orifice 130 using the second hot runner sub-system 131. Because the first material 124 was previously injected into the first portion 111 of the first mold cavity 101 and due to the proximity between the first and second injection orifices 120, 130 as discussed above, the second material 134 is injected into the first material 124 to displace the first material 124 within the first mold cavity 101. In certain embodiments, the second material 134 is injected into the first mold cavity 101 until the entire volume of the first mold cavity 101 is filled with the combination of the first and second materials 124, 134. Thus, the second material 134 has a volume that is between 20% and 40% of the first volume, between 25% and 35% of the first volume, or approximately 30% of the first volume. Thus, in certain embodiments the volume of the first material 124 within the first mold cavity 101 is greater than the volume of the second material 134 within the first mold cavity 101, and the sum of the volumes of the first and second materials 124, 134 is substantially equal to the volume of the first mold cavity 101. In certain embodiments, a ratio of the volume of the first material 124 within the first mold cavity 101 to the volume of the second material 134 within the first mold cavity 101 is between 1.5:1 and 4:1, more specifically between 2:1 and 3:1, and still more specifically between 2.2:1 and 2.5:1.

As the second material 134 is injected into the first mold cavity 101, the second material 134 displaces/pushes the first material 124 deeper into the first mold cavity 101 and into the second portion 112 of the first mold cavity 101 to form the head portion 312 of the base structure 310. In certain embodiments the head portion 312 of the base structure 310 comprises only the first material 124 and none of the second material 134. The second material 134 is injected into the first material so that the second material 134 forms the core component 314 of the base structure 310 and the first material 124 forms the shell component 313 of the base structure 310. In the exemplified embodiment, each of the first and second materials 124, 134 is injected into the first portion 111 of the first mold cavity 101 at an orientation that is substantially perpendicular to the first mold cavity axis A-A.

FIG. 4 illustrates the first mold cavity 101 after it is completely filled with the first and second materials 124, 134 and after the first and second materials 124, 134 have cooled and hardened. Thus, the structure in the first mold cavity 101 in FIG. 4 is the base structure 310 of the oral care implement 300. Specifically, FIG. 4 illustrates the first material 124 forming the shell component 313 of the base structure 310 and the second material 134 forming the core component 314 of the base structure 310. In the exemplified embodiment, the core component 314 does not extend into the head portion 312 of the base structure 310, but rather the core component 314 is entirely contained within the handle portion 311 of the base structure 310. Of course, it is possible that the core component 314 could extend into the head portion 312 in some embodiments as desired by altering the volume of the first and second materials 124, 134 injected into the first mold cavity 101 and/or altering the delay time between injection of the first and second materials 124, 134. After the base structure 310 has hardened within the first mold cavity 101, the first mold 100 is opened and the base structure 310 is removed from the first mold cavity 101. The injection, delay, cooling, and removal steps can all be accomplished automatically in some embodiments with the use of appropriate processors and software.

Referring to FIGS. 4 and 5 concurrently, the base structure 310 will be further described. As noted above, when the second material 134 is injected into the first mold cavity 101, the second material 134 displaces the first material 124 and forms the core component 314 of the base structure 310 that is substantially surrounded by the shell component 313 of the base structure 310 formed by the first material 124. As noted above, the first material 124 may be transparent or translucent. Furthermore, the second material 134 is preferably an opaque material and may comprise any color such as white, red, green, blue, yellow, combinations thereof, or the like. Furthermore, in certain embodiments the second material 134 may be the same material as the first material 124 except that the first material 124 is transparent or translucent and the second material 134 is opaque. Thus, in certain embodiments both the first and second materials 124, 134 are copolymers. In other embodiments the second material 134 may be a different material than the first material 124. In such embodiments, the second material 134 may be polypropylene, styrene acrylonitrile (SAN), polyethylene, polyamide, cellulosic, acrylic, ABS, or other hard plastic materials that are commonly used in toothbrush manufacture. Thus, the first and second materials 124, 134 may be the same material or different materials, but it is preferable that the first material 124 that forms the shell component 313 be transparent or translucent so that it can be seen through and that the second material 134 that forms the core component 314 be opaque so that it is visible to a user's eyes through the shell component 313 (although the opposite configuration is also possible wherein the first material 124 is opaque and the second material 134 is transparent/translucent in some embodiments).

The base structure 310 of the oral care implement 300 comprises an exposed outer surface 320, a front surface 321, and an opposite rear surface 322. Because only the second material 134 is injected into the first mold cavity 101 through the second injection orifice 130 (the first material 124 is never injected through the second injection orifice 130 because the first material 124 is only fluidly coupled to the first injection orifice 120) and because the second material 134 is injected into the first mold cavity 101 after injection of the first material 124 has stopped, a portion 323 of the exposed outer surface 320 of the handle portion 311 of the base structure 310 that is aligned with the second injection orifice 130 is formed of the second material 134. The remainder of the exposed outer surface 320 of the handle portion 311 of the base structure 310 is formed of the first material 124. Thus, as can be seen in FIG. 5, the portion 323 of the exposed outer surface 320 of the handle portion 311 of the base structure 310 that is formed of the second material 134 is readily visible. Stated another way, the handle portion 311 of the base structure 310 has a first gate point 324 on the outer surface 320 that corresponds to the injection location of the first material 124 and a second gate point 325 on the outer surface 320 that corresponds to an injection location for the second material 134.

The portion 323 of the exposed outer surface 320 of the handle portion 311 of the base structure 310 that is formed of the second material 134 (i.e., the second gate point 325) is a location at which the second material 134 protrudes through the first material 124. In the exemplified embodiment, the portion 323 of the exposed outer surface 320 of the handle portion 311 of the base structure 310 is the only location at which the second material 134 protrudes through the first material 124 and is exposed at the outer surface 320 of the base structure 310. In the exemplified embodiment, the first material 124 entirely surrounds the second material 134 (i.e., the shell component 313 entirely surrounds the core component 314). However, the first material 124 does not completely envelop the second material 134 because the second material 134 extends through the first material 124 to form the portion 323 of the exposed outer surface 320 of the handle portion 311 of the base structure 310.

In the exemplified embodiment, both of the first and second injection orifices 120, 130 are aligned with the rear surface 322 of the handle portion 311 of the base structure 310. Thus, in the exemplified embodiment the portion 323 of the exposed outer surface 320 of the handle portion 311 of the base structure 310 is located on the rear surface 322 of the handle portion 311 of the base structure 310. Stated another way, the first and second gate points 324, 325 are both located on the rear surface 322 of the handle portion 311 of the base structure 310. Of course, the invention is not to be so limited in all embodiments and in certain other embodiments the portion 323 of the exposed outer surface 320 of the handle portion 311 of the base structure 310 may be located on the front surface 321 of the handle portion 311 or one of the lateral surfaces of the handle portion 311 between the front and rear surfaces 321, 322 by changing the relative locations of the second injection orifice 130.

Referring to FIG. 5 and as noted above, the handle portion 311 of the base structure 310 has the length L2 that may be between 150 mm and 170 mm, more specifically between 155 mm and 165 mm, and still more specifically approximately 160 mm. Furthermore, the core component 314 of the handle portion 311 of the base structure 310 has a length L3 that may be between 130 mm and 150 mm, more specifically between 135 mm and 145 mm, and still more specifically approximately 142 mm (with tolerances of up to 3%). In certain embodiments, a ratio of the length L2 of the handle portion 311 to the length L3 of the core component 314 is between 1.1:1 and 1.4:1. In one specific embodiment, the length L2 is approximately 160 mm and the length L3 is approximately 142 mm and the ration L2:L3 is approximately 1.13:1. Of course, other lengths are possible in other embodiments, and ratios between the length L2 and the length L3 can fall outside of the range noted above in certain embodiments. Thus, although the ratios and lengths provided herein are for one exemplary embodiment, other embodiments are possible and within the scope of the disclosure set forth herein.

The core component 314 has a thickness measured between opposing first and second lateral sides 316, 317 of the handle portion 311 of the base structure 310. In the exemplified embodiment, the thickness of the core component 314 tapers in a direction away from the first and second injection orifices 120, 130 and towards the head portion 312 of the base structure 310. Stated another way, the thickness of the core component 314 increases at it extends from a distal end 318 of the core component 314 towards the proximal end 301 of the oral care implement 300. At a transverse cross-section taken through the base structure 310 at the portion 323 of the exposed outer surface 320 of the handle portion 311 of the base structure 310 that is formed of the second material 134, the second material 134 (or the core component 314) makes up between 70% and 90%, more specifically between 70% and 80%, and still more specifically between 70% and 75% of the diameter of the base structure 310. At a distance from the portion 323 of the exposed outer surface 320 of the handle portion 311 of the base structure 310 that is formed of the second material 134 in a direction towards the head portion 312, the diameter/thickness of the core component 314 tapers and decreases and reaches 0 mm at the distal end 318 of the core component 314. In the exemplified embodiment, the core component 314 is only located in the handle portion 311 of the base structure 310 and does not extend to the head portion 312 of the base structure 310.

After the base structure 310 is formed as described herein above, the elastomeric overmold 330 is formed onto the base structure 310. In that regard, referring to FIG. 6, a second mold 200 is illustrated having a second mold cavity 201. In this embodiment, the second mold 200 comprises a first mold half 202 and a second mold half 203, although the invention is not to be so limited in all embodiments and more than two portions may make up the second mold 200 in other embodiments. The second mold 200 defines the second mold cavity 201 within which the base structure 310 can be positioned. After the base structure 310 formed as described above is positioned within the second mold cavity 201, a third material 224 can be injected into the second mold cavity 201 and onto the base structure 310 to form the elastomeric overmold 330 as will be described herein below with reference to FIGS. 7-9. Thus, the second mold cavity 201 has a volume that is greater than the volume of the base structure 310 (and greater than the volume of the first mold cavity 101) so that spaces remain in the second mold cavity 201 for a material to flow onto the base structure 310.

Figure 6:
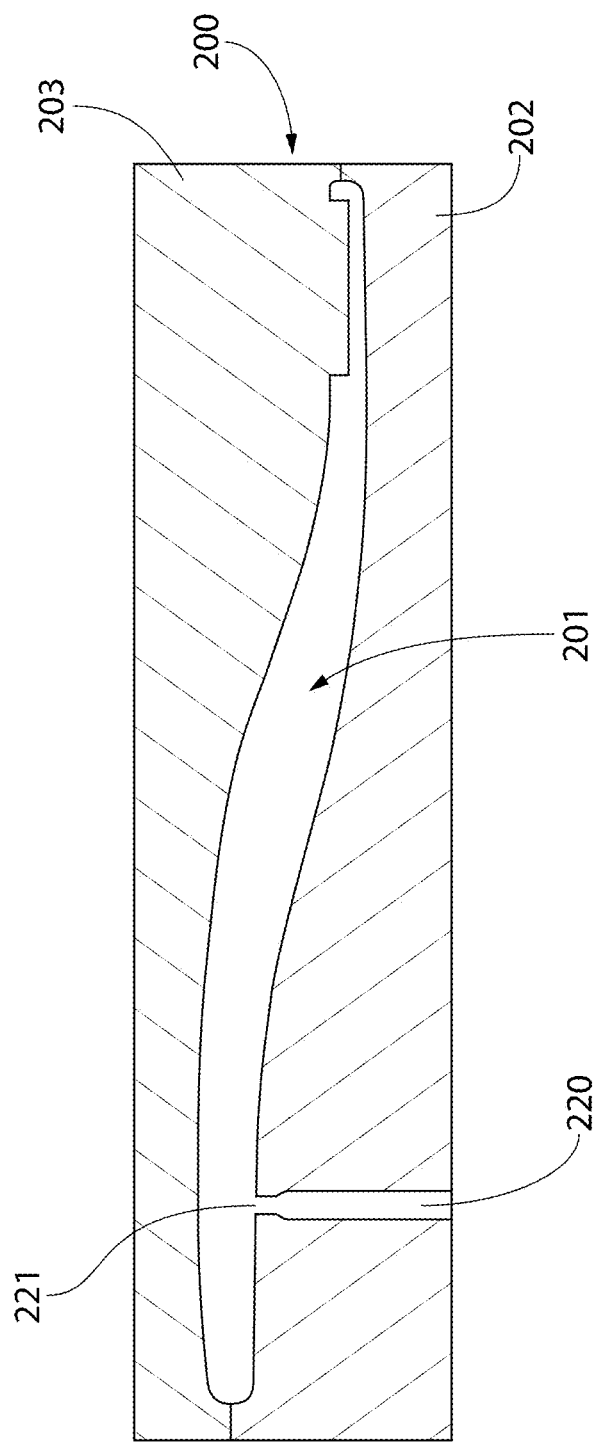
FIG. 6 is a schematic cross-sectional view of a second mold defining a second mold cavity.

For purposes of injecting the third material 224 into the second mold cavity 201, FIG. 6 illustrates a runner 220 that terminates at an injection orifice 221. The runner 220 is a channel formed into the mold 200 that provides a passageway from a source of the third material 224 to the injection orifice 221 for injection into the second mold cavity 201. The runner 220 in this embodiment may be a hot runner or a cold runner. Thus, although the runners described above for forming the base structure 310 are all hot runners, forming the elastomeric overmold 330 can be achieved via hot runner or cold runner as desired. Furthermore, the runner 220 will be fluidly coupled to a source of the third material 224, although such source is not depicted in the drawings. The runner 220 and the injection orifice 221 collectively form a passageway from the source of the third material 224 into the second mold cavity 201. The exact location of the injection orifice 221 may be different than that which is depicted in FIG. 6, and the invention is not to be limited by the location of the injection orifice 221 in all embodiments.

Figure 7:
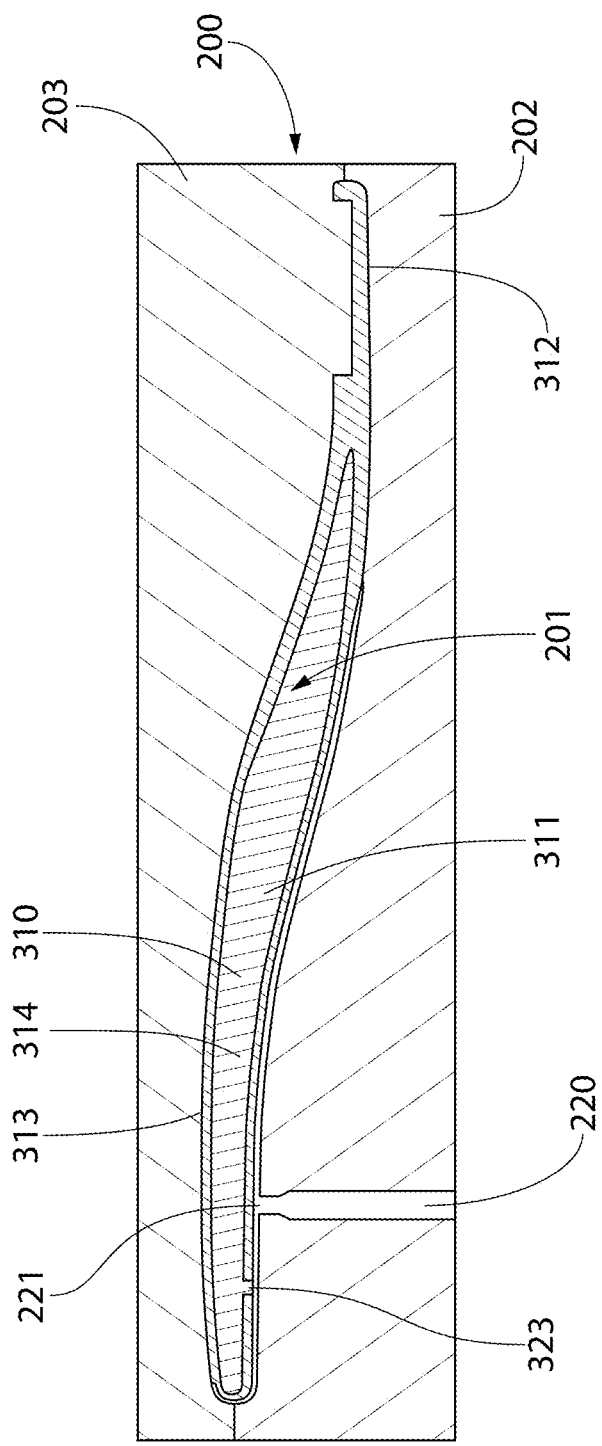
FIG. 7 is a schematic cross-sectional view of the second mold of FIG. 6 with the base structure of FIG. 5 positioned therein.
Figure 8:
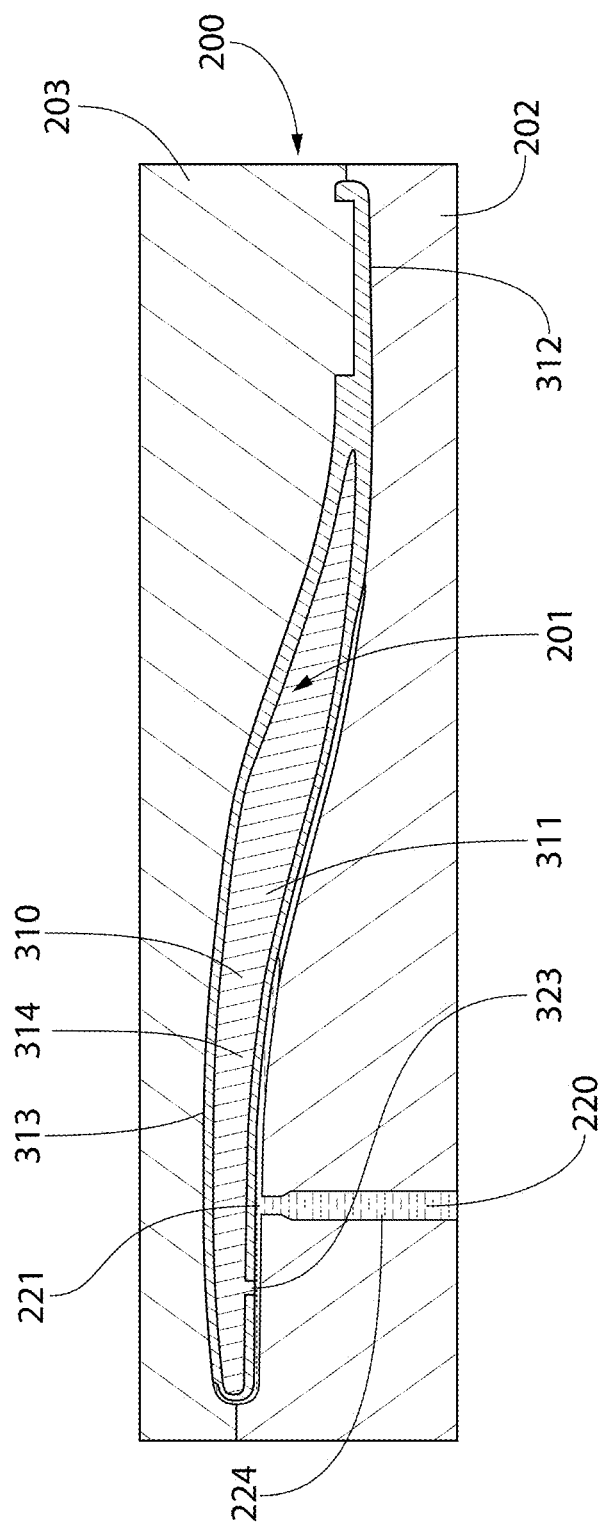
FIG. 8 is a schematic cross-sectional view of the second mold and base structure of FIG. 7, wherein a third material is being injected into the second mold cavity.
Figure 9:
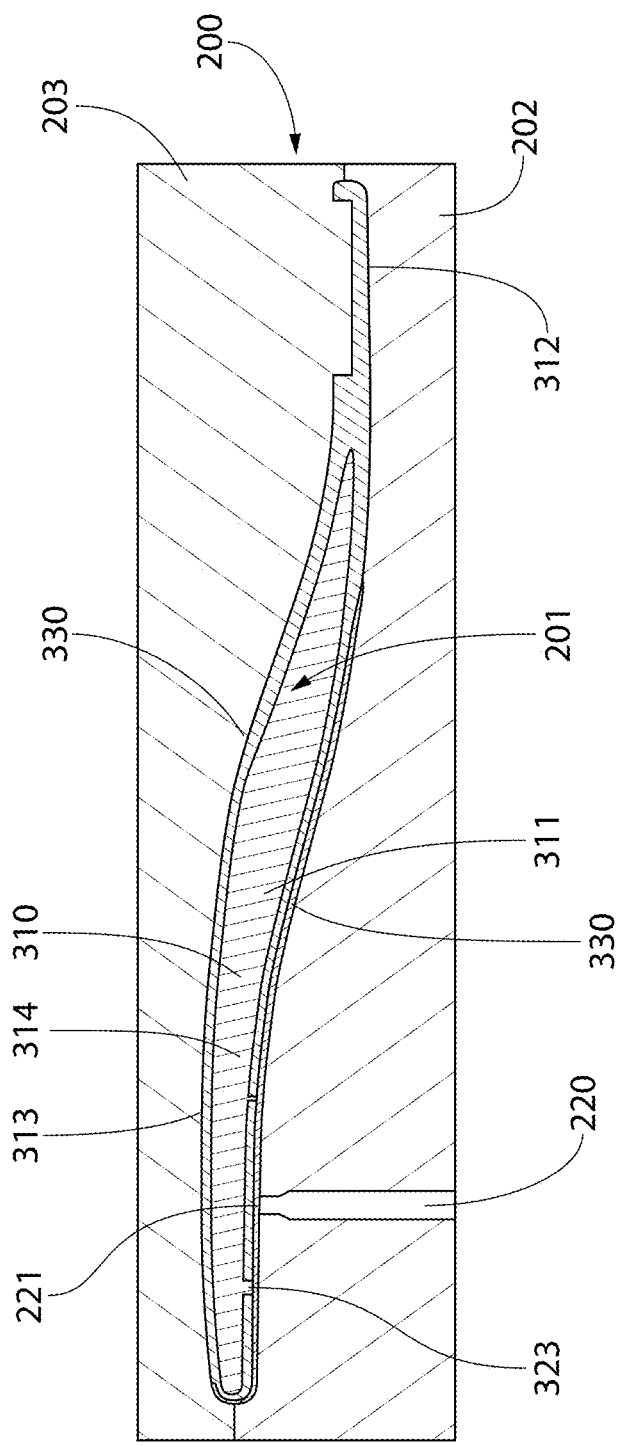
FIG. 9 is a schematic cross-sectional view of the second mold of FIG. 7 illustrating the oral care implement including the base structure and a grip formed of the third material positioned in the second mold cavity.

Referring to FIGS. 7-9, the method of injecting the third material 224 into the second mold cavity 201 will be described. First, after the base structure 310 is fully cooled and hardened and removed from the first mold cavity 101 as described herein above, the base structure 310 is positioned within the second mold cavity 201. FIG. 7 illustrates the second mold 200 with the base structure 310 positioned within the second mold cavity 201. As can be seen in FIG. 7, the second mold cavity 201 has a greater volume than that which is taken up by the base structure 310, so that spaces remain in the second mold cavity 201. The third material 224 that forms the elastomeric overmold 330 fills in these spaces upon injection into the second mold cavity 201.

Referring to FIG. 8, injection of the third material 224 into the second mold cavity 201 is illustrated. Thus, after the base structure 310 is positioned within the second mold cavity 201, the third material 224 is injected into the second mold cavity 201 to fill in the spaces of the second mold cavity 201 that are not already taken up by the base structure 310. The third material 224 is injected into the second mold cavity 201 in a liquefied or molten state. The third material 224 may, in certain embodiments, be an elastomeric material such as a thermoplastic elastomer. The invention is not to be so limited and in certain other embodiments the third material 224 may be a hard plastic such as polypropylene or any of the other types of plastic described above with reference to the first and second materials 124, 134. Thus, the third material 224 is injected onto the base structure 310 within the second mold cavity 201 to form a grip on the base structure 310.

FIG. 9 illustrates the oral care implement 300 within the second mold cavity 201 after injection of the third material 224 has stopped and the third material 224 has cooled and hardened. Thus, in FIG. 9 the base structure 310 and the elastomeric overmold 330 of the oral care implement 300 are located within the second mold cavity 201. The oral care implement 300 remains in the second mold cavity 201 until the third material 224 cools and hardens to form the elastomeric overmold 330, and then the oral care implement 300 can be removed from the second mold cavity 201. As can be seen in FIGS. 8 and 9, the third material 224 covers the portion 323 of the exposed outer surface 320 of the handle portion 311 of the base structure 310 that is formed of the second material 134 (i.e., the third material 224 covers the second gate point 325, and actually covers both the first and second gate points 324, 325). Thus, in the completely formed oral care implement 300, no portion of the second material 134 (or the core component 314) is exposed on the outer surface. This can also be seen in FIG. 10 where the elastomeric overmold 330 covers the portion 323 of the exposed outer surface 320 of the handle portion 311 of the base structure 310 formed of the second material 134 on the rear surface 322. Thus, the elastomeric overmold 330 is used to cover the blemish that results from the second material 134 being exposed as described above.

In addition to covering the portion 323 of the second material 134 that is exposed on the outer surface 320 of the base structure 310, the elastomeric overmold 330 may form a grip on the handle portion 310 of the base structure 310 to prevent slippage during use and add to the comfort for a user. Thus, the elastomeric overmold 330 may form a grip on the region of the handle portion 310 of the base structure 310 that would be gripped by a user's thumb and forefinger/index finger during use.

In addition to its functional uses, the elastomeric overmold 330 may create a desirable aesthetic. In certain embodiments, the second material 134 that forms the core component 314 may comprise a first color and the third material 224 that forms the elastomeric overmold 330 may comprise a second color. The first and second colors may be the same in some embodiments and different in other embodiments in order to create a desired aesthetic. Thus, in certain embodiments the first material 124 that forms the shell component 313 is transparent, the second material 134 that forms the core component 314 is a first color, and the third material 224 that forms the elastomeric overmold 330 is a second color that is the same as or different than the first color. Due to the core component 314 being substantially surrounded by the shell component 313 and due to the elastomeric overmold 330 covering the only portion of the core component 314 or second material 134 that extends through the shell component 313, the core component 314 has the appearance of floating within the shell component 313. Furthermore, in some embodiments one or more of the first, second, and third materials 124, 134, 224 may be a recycled material and one or more of the first, second, and third materials 124, 134, 224 may be a virgin (unused) material.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A system for forming an oral care implement comprising a base structure having a handle portion and a head portion, the system comprising:
    a first mold defining a first mold cavity having a first mold cavity axis, the first mold cavity comprising a first portion that corresponds to the handle portion of the base structure and a second portion that corresponds to the head portion of the base structure;
    a first injection orifice formed into the first mold and providing a first passageway directly into the first portion of the first mold cavity;
    a second injection orifice formed into the first mold and providing a second passageway directly into the first portion of the first mold cavity, the second injection orifice spaced apart from the first injection orifice;
    a first hot runner sub-system fluidly coupled to the first injection orifice;
    a second hot runner sub-system fluidly coupled to the second injection orifice;
    wherein the system is configured to dispense the first material into the first portion of the first mold cavity via the first injection orifice with the first hot runner sub-system, and after passage of a predetermined period of time, to subsequently dispense the second material into the first portion of the first mold cavity via the second injection orifice with the second hot runner sub-system, the second material being injected into the first material to displace the first material, thereby forming the base structure such that the second material forms a core component of the base structure and the first material forms a shell component of the base structure that surrounds the core component;

wherein the first and second materials collectively form the head portion and the handle portion of the base structure, and wherein a portion of an exposed outer surface of the handle portion of the base structure that is aligned with the second injection orifice of the first mold is formed of the second material, a remainder of the exposed outer surface of the base structure being formed of the first material; and a second mold defining a second mold cavity, and wherein the system is further configured to dispense a third material into the second mold cavity when the base structure of the oral care implement is positioned in the second mold cavity, the third material covering the portion of the exposed outer surface of the handle portion of the base structure that is formed of the second material.

2. The system according to claim 1 wherein the first material is transparent or translucent and the second material is opaque.

3. The system according to claim 1 wherein the first mold comprises a first mold portion and a second mold portion that collectively define the first mold cavity, each of the first and second injection orifices formed into the first mold portion, wherein the first hot runner sub-system comprises a first hot runner nozzle having a first gate that is positioned within the first mold portion and fluidly coupled to the first injection orifice and wherein the second hot runner sub-system comprises a second hot runner nozzle having a second gate that is positioned within the first mold portion and fluidly coupled to the second injection orifice.

4. The system according to claim 1 wherein each of the first and second materials is injected into the first mold cavity at an orientation that is perpendicular to the first mold cavity axis.

5. The system according to claim 1 wherein the first and second injection orifices are aligned along a first plane that comprises the first mold cavity axis, and wherein the first and second injection orifices are located on the same side of a second plane that comprises the first mold cavity axis and is orthogonal to the first plane.

6. The system according to claim 1 wherein the first portion of the first mold cavity comprises a first axial section, a second axial section, and a third axial section, the first axial section being adjacent to the second portion of the first mold cavity, the second axial section being positioned between the first and third axial sections, and the third axial section comprising a proximal end of the first portion of the first mold cavity, and wherein each of the first and second injection orifices provides a direct passageway into the third axial section of the first portion of the first mold cavity, wherein the first axial section has a first length, the second axial section has a second length, and the third axial section has a third length, each of the first, second, and third lengths being substantially the same.

7. The system according to claim 1 wherein the system is free of cold runners.

8. The system according to claim 1 wherein the first and second hot runner sub-systems are fluidly isolated from one another so that only the first material flows through the first hot runner sub-system and through the first injection orifice and only the second material flows through the second hot runner sub-system and through the second injection orifice, wherein the second material does not flow through the first hot runner sub-system or through the first injection orifice and wherein the first material does not flow through the second hot-runner sub-system or through the second injection orifice.

9. The system according to claim 1 wherein the third material is a thermoplastic elastomer.

10. The system according to claim 1 wherein one of the first and second injection orifices is spaced a first distance from a proximal end of the first portion of the first mold cavity and the other of the first and second injection orifices is spaced a second distance from the proximal end of the first portion of the first mold cavity, the first distance being greater than the second distance, wherein the first injection orifice is spaced the first distance from the proximal end of the first portion of the first mold cavity and the second injection orifice is spaced the second distance from the proximal end of the first portion of the first mold cavity.

11. The system according to claim 1 wherein a ratio of a length of the handle portion of the base structure to a length of the core component of the handle portion of the base structure is between 1.1:1 and 1.4:1, and wherein a ratio of the length of the handle portion of the base structure to a distance measured between the first and second injection orifices is between 3:1 and 8:1.

12. The system according to claim 1 wherein the first injection orifice has a first transverse cross-sectional area and the second injection orifice has a second transverse cross-sectional area, the first and second transverse cross-sectional areas being substantially the same.

13. The system according to claim 1 wherein the second material forming the core component of the base structure is substantially entirely surrounded by the first material forming the shell component of the base structure.

14. The system according to claim 1 wherein a thickness of the core component measured between opposing first and second lateral sides of the handle portion of the base structure of the oral care implement tapers towards the head portion of the base structure of the oral care implement.

15. The system according to claim 1 wherein a thickness of the core component measured between opposing first and second lateral sides of the handle portion increases as it extends from a distal end of the core component towards a proximal end of the handle portion of the base structure.

16. An oral care implement comprising:
a base structure comprising a handle portion and a head portion, the handle portion having an outer surface;
the handle portion comprising a first material that forms a shell component and a second material that forms a core component, the shell component substantially surrounding the core component;
the handle portion having a first gate point on the outer surface that corresponds to an injection location for the first material and a second gate point on the outer surface that corresponds to an injection location for the second material, the first and second gate points being spaced apart from one another; and
a third material overmolded onto the base structure that covers the first and second gate points, wherein the third material is a thermoplastic elastomer.

17. The oral care implement according to claim 16 wherein the handle portion of the base structure comprises a first axial section, a second axial section, and a third axial section of equal length, the first axial section being adjacent to the head portion of the base structure, the second axial section being positioned between the first and third axial sections, and the third axial section comprising a proximal end of the handle portion, and wherein each of the first and second gate points is located within the third axial section of the handle portion.

18. The oral care implement according to claim 16 wherein the first gate point is located a first distance from the proximal end of the handle portion and the second gate point is located a second distance from the proximal end of the handle portion, the first distance being greater than the second distance.

19. The oral care implement according to claim 16 wherein the first material is transparent or translucent and the second material is opaque.

* * * * *